United States Patent
Zhou et al.

(10) Patent No.: US 11,860,078 B2
(45) Date of Patent: Jan. 2, 2024

(54) PARTICLE SIZE DISTRIBUTION CONTROL IN DISC MILLING SYSTEM BASED STOCHASTIC DISTRIBUTION CONTROL EXPERIMENTAL DEVICE AND METHOD

(71) Applicant: NORTHEASTERN UNIVERSITY, Shenyang (CN)

(72) Inventors: Ping Zhou, Shenyang (CN); Xiangzhi Zhao, Shenyang (CN); Mingjie Li, Shenyang (CN); Hong Wang, Shenyang (CN)

(73) Assignee: NORTHEASTERN UNIVERSITY, Shenyang (CN)

( * ) Notice: Subject to any disclaimer, the term of this patent is extended or adjusted under 35 U.S.C. 154(b) by 1142 days.

(21) Appl. No.: 16/483,706

(22) PCT Filed: Apr. 9, 2019

(86) PCT No.: PCT/CN2019/081827
§ 371 (c)(1),
(2) Date: Aug. 5, 2019

(87) PCT Pub. No.: WO2020/199231
PCT Pub. Date: Oct. 8, 2020

(65) Prior Publication Data
US 2020/0309660 A1    Oct. 1, 2020

(30) Foreign Application Priority Data
Mar. 29, 2019    (CN) .......................... 201910250610.X

(51) Int. Cl.
*G01N 15/02*    (2006.01)
*G05B 15/02*    (2006.01)
*B02C 7/12*    (2006.01)

(52) U.S. Cl.
CPC ............. *G01N 15/02* (2013.01); *G05B 15/02* (2013.01); *B02C 7/12* (2013.01)

(58) Field of Classification Search
CPC .... B02C 7/11; B02C 7/14; B02C 7/16; B02C 7/12; G05B 15/02; G01N 15/02; G01N 15/0205
(Continued)

(56) References Cited

U.S. PATENT DOCUMENTS

| 5,040,734 A * | 8/1991 | Belchamber ............ B02C 25/00 241/33 |
| 2020/0101468 A1* | 4/2020 | Zhou ........................ B02C 7/16 |

FOREIGN PATENT DOCUMENTS

| CN | 101654887 A | 2/2010 |
| CN | 105568732 A | 5/2016 |

(Continued)

OTHER PUBLICATIONS

Chinese Search Report based on Application No. PCT/CN2019/081827; dated Dec. 27, 2019.

*Primary Examiner* — John H Le
(74) *Attorney, Agent, or Firm* — Muncy, Geissler, Olds & Lowe, P.C.

(57) ABSTRACT

An experimental device for SDC of powder particle sizes in a disc mill system includes a screw feeding control device, a mill speed adjustment device, a disc gap servo control device, a sampling device, a laser particle analyzer, a control cabinet and an upper computer. A control method for the experimental device includes the following steps: 1) performing initial setting; 2) starting the disc mill system; 3) performing sampling through a sampling device; 4) detecting a actual PDF (probability density function) shaping of distribution of powder particle sizes through the laser particle analyzer; and 5) updating the initial setting through a SDC algorithm. The experimental device and method can (Continued)

verify a series of SDC algorithms, and provides good a better experimental platform for teaching and scientific research; and the shape of non-Gaussian distribution of output random variables of a stochastic distribution system can be effectively controlled.

4 Claims, 7 Drawing Sheets

(58) Field of Classification Search
USPC .......................................................... 702/179
See application file for complete search history.

(56) References Cited

FOREIGN PATENT DOCUMENTS

| | | |
|---|---|---|
| CN | 107442262 A | 12/2017 |
| CN | 108536017 A | 9/2018 |
| CN | 108846178 A | 11/2018 |
| WO | WO-02/072310 A1 | 9/2002 |

\* cited by examiner

PARTICLE SIZE DISTRIBUTION CONTROL IN DISC MILLING SYSTEM BASED STOCHASTIC DISTRIBUTION CONTROL EXPERIMENTAL DEVICE AND METHOD

BACKGROUND OF THE INVENTION

1. Field of the Invention

The present invention relates generally to a distribution control, and more particularly, to an experimental device and method for SDC (stochastic distribution control) of powder particle sizes of a disc mill system.

2. The Prior Arts

The control achievements of an early stochastic system focus on statistical properties for variables of the system, the most typical examples of the achievements include linear quadratic Gaussian, minimum variance control, stochastic control with a Markov phase step parameter system and the like, and control objectives are first-order and second-order statistical properties output by the system, namely a mean value and a variance. When the system is interfered by Gaussian noise, the variance and the mean value can determine an output PDF (probability density function) shaping. However, many actual industrial processes do not meet an assumed condition of Gaussian output, and the PDF shaping of output random variables is asymmetric and is in a multi-peak state, so that stochastic distribution properties of the output variables cannot be accurately reflected by adopting traditional mean value and variance. Therefore, Professor Hong Wang puts forward an idea that a controller is directly designed for enabling the output PDF shaping of the system to track a PDF shaping of a given target since 1996, many modelling and control methods are systematically established, the research framework is called SDC (stochastic distribution control, H. Wang. bounded dynamic stochastic distributions modelling and control [M]. Springer-Verlag (London) Ltd, 2000), and the type of control summarizes the control of the mean value and the variance of the output variables in a conventional stochastic system in a sense.

Additionally, in the control engineering practice, the problem of distribution control of certain variables is always a challengeable problem, and study on SDC always results from complex industrial process control requirements. For example, in a papermaking process, two-dimensional quality distribution of paper is a key process index for measuring the paper quality, therefore, the papermaking process can be treated as a typical dynamic stochastic distribution system, and the key control requirement is that the two-dimensional quality distribution of the paper is enabled to meet the requirement of an expected given distribution shape as far as possible. In a chemical polymerization process, MWD (molecular weight distribution) is often treated as a key quality index in product quality control and process optimization, therefore, the main purpose of control of the polymerization process is that the shape of MWD of a polymerization product is enabled to conform with a given distribution shape. In a combustion process, flame temperature field distribution is often treated as an important index of benefits of the combustion process, and the purpose of the control of the combustion process is that the distribution shape of the flame temperature field is enabled to meet the given requirement by selecting appropriate fuel input quantities and process parameters. In a grain processing process, the shape of particle size distribution of processed grains is usually hoped to conform with an expected distribution shape, so that the shape of the particle size distribution of the pulverized grains conforms with the requirement of a follow-up food processing procedure, and the control quality and the production efficiency of the whole system are improved.

A novel control method lacks of an experimental device for verifying the effectiveness and the feasibility at present, so that a control method adopting the control technology causes much inconvenience in promotion and application of an actual industrial process, and the present invention provides an experimental device and method for SDC (stochastic distribution control) of powder particle sizes in a disc mill system.

SUMMARY OF THE INVENTION

In accordance with the condition that an experimental device for verifying the effectiveness and the feasibility of a stochastic distribution control method, the present invention provides an experimental device for SDC (stochastic distribution control) of powder particle sizes in a disc mill system. Through adoption of the disc mill system, the experimental device comprises a screw feeding control device, a mill speed adjustment device, a disc gap servo control device, a sampling device, a laser particle analyzer, a control cabinet and an upper computer.

The disc mill system is a vertical double-disc powder mill and comprises a movable mill disc and a corresponding fixed mill disc.

The screw feeding control device comprises a screw feeder, a first DC (direct current) motor and an electronic scale. The screw feeder is connected with the first DC motor, and the electronic scale is connected with the upper computer and is used for a measuring actual screw feeding amount.

The mill speed adjustment device comprises a frequency converter and a three-phase asynchronous motor. The three-phase asynchronous motor is connected with the movable mill disc of the disc mill system; after a material enters a mill area, the movable mill disc is driven by the three-phase asynchronous motor to rotate. The frequency converter is mounted in the control cabinet.

The disc gap servo control device comprises an AC (alternating current) servo motor, a speed reducer and a displacement sensor. The AC servo motor is connected with the speed reducer. The speed reducer is connected with the movable mill disc of the disc mill system. The displacement sensor is mounted on a driving shaft connected with the movable mill disc in the disc mill system and is connected with the upper computer.

The sampling device comprises a second DC motor, a sampling casing pipe and a powder recovery tank. The sampling casing pipe is connected with a powder outlet of the disc mill system and the powder recovery tank respectively.

According to a detection period of the laser particle analyzer, a starting time and a stopping time of the second DC motor are set.

A PLC (programmable logic controller) is arranged in the control cabinet, the PLC is connected with the first DC motor of the screw feeding control device, the second DC motor of the sampling device and the AC servo motor of the disc gap servo control device respectively, and the frequency converter is connected with the three-phase asynchronous motor of the mill speed adjustment device.

The PLC and the frequency converter are both connected with the upper computer and are used for receiving an instruction sent by the upper computer.

The screw feeding control device is used for controlling the screw feeding amount according to a screw speed of the screw feeder, and the screw feeding amount is set by the upper computer, so that quantitative feeding of the disc mill system is achieved.

The mill speed adjustment device is used for controlling a mill speed by adjusting frequency of the frequency converter.

The disc gap servo control device is used for driving the movable mill disc to move horizontally, a position of the fixed mill disc is taken as a zero position, and the displacement sensor is used for acquiring a position signal of the movable mill disc in real time, feeding back the position signal to a system of the upper computer for calculating a disc gap and driving the movable mill disc to adjust the position according to a calculation result, so that the displacement of the movable mill disc is accurately positioned, and the disc gap is controlled by accurately positioning the movable mill disc.

When the second DC motor in the sampling device is in a starting state, powder is sampled, a sampling amount of the powder is controlled according to the length of the starting time of the second DC motor, and the powder is conveyed into the laser particle analyzer through the sampling casing pipe; when the second DC motor in the sampling device is in a stopping state, the produced powder enters the powder recovery tank, and intermittent sampling is achieved; the sampling amount in every detection period is the same, and the sampling amount is adjusted by controlling the length of the starting time of the second DC motor in the sampling device.

The upper computer comprises a SDC algorithm. The upper computer is used for setting the initial screw feeding amount, the mill speed, the mill disc gap, a target PDF (probability density function) shaping of the distribution of powder particle sizes as well as the starting time and the stopping time of the second DC motor in the sampling device and receiving set values of the screw feeding amount, the mill speed and the disc gap which are obtained by adopting the SDC algorithm.

The set values of the screw feeding amount, the mill speed and the disc gap are updated by adopting the SDC algorithm according to an actual PDF shaping of the distribution of the powder particle sizes and the set target PDF shaping of the distribution of the powder particle sizes.

The screw feeding amount is controlled by controlling the screw speed in the screw feeding control device.

The mill speed is controlled by adjusting the frequency of the frequency converter.

The movable mill disc is driven by the AC servo motor to move, and the mill disc gap is controlled by accurately positioning the movable mill disc.

Updated set values of the screw feeding amount, the mill speed and the disc gap are calculated by adopting the SDC algorithm according to the PDF shaping of the distribution of the powder particle sizes, detected by the laser particle analyzer, and the target PDF shaping of the distribution of the powder particle sizes; a user can query the curve of the PDF shaping of the distribution of the powder particle sizes, which is detected by the laser particle analyzer, through the upper computer.

The laser particle analyzer is a Sympatec powder laser particle analyzer and is used for detecting the distribution of particle sizes of powder samples obtained by the sampling device, so as to obtain a PDF (probability density function) shaping of the distribution of the powder particle sizes.

The present invention provides a control method of the experimental device for SDC of the powder particle sizes in the disc mill system adopts the experimental device for SDC of the powder particle sizes of the disc mill system and comprises the following steps:

step 1, performing initial setting:
according to production efficiency of the disc mill system, setting a target PDF (probability density function) shaping of the distribution of the powder particle sizes, the initial screw feeding amount, the starting time and the stopping time of the sampling device, an initial disc gap and an initial mill speed through a system of the upper computer;

wherein the starting time and the stopping time of the sampling device are set according to a detection time required by the laser particle analyzer.

the initial mill speed is set according to actual material hardness and the production efficiency of the disc mill system;

a control flow process of the screw feeding amount lies in that the screw speed is adjusted according to the actual screw feeding amount measured by the electronic scale, so that quantitative feeding of the screw feeding control device is achieved, and then the material is conveyed into the mill area of the disc mill system;

a control flow process of the mill speed lies in that the mill speed of the disc mill system is controlled by adjusting frequency of the frequency converter until the actual mill speed reaches the set mill speed;

a control flow process of the disc gap lies in that the system of the upper computer is used for controlling the rotating speed of the AC servo motor to drive the movable mill disc to move horizontally; a position of the fixed mill disc is taken as a zero position; a moving speed is adjusted by the speed reducer in a moving process; the displacement sensor is used for acquiring a position signal of the movable mill disc in real time and feeding back the position signal to the upper computer; through comparison of the position signal with the set mill disc gap, whether the movable mill disc reaches a specified position is judged, and the disc gap servo control device is controlled for correspondingly adjusting a position of the movable mill disc, so that a disc gap between the movable mill disc and the fixed disc can reach the set mill disc gap;

step 2, starting the disc mill system;

step 3, performing sampling through the disc mill system according to the starting time and the stopping time of the sampling device;

wherein a control flow process of the sampling device lies in that the second DC motor is started for sampling when the starting time reaches the set starting time of the second DC motor, and powder enters the laser particle analyzer; the second DC motor is stopped when the stopping time reaches the set stopping time of the second DC motor, and the powder enters the powder recovery tank, so that intermittent sampling is achieved; a sampling amount in every detection period is the same, and the sampling amount is judged by adjusting the length of the starting time;

step 4, acquiring an actual PDF shaping of the distribution of the powder particle sizes and feeding back the actual PDF shaping to the upper computer through the laser particle analyzer; and step 5, updating the set values of the screw feeding amount, the disc gap and the mill speed with a SDC algorithm if the PDF shaping of the distribution of the powder particle sizes is inconsistent with the target PDF shaping of the distribution of the powder particle sizes; otherwise, ending the control flow process if the PDF shaping of the distribution of the powder particle sizes meets production requirements.

According to the SDC theory, a modelling and control method of a stochastic distribution system is described as follows:

$y \in [\alpha, \xi]$ represents a uniformly-bounded stochastic variable for describing output of a dynamic stochastic distribution system, and is an output random variable; and $u(k) \in R^m$ represents a control input of the stochastic distribution system at the time k, which indicates that the output random variable y is described through the PDF shaping at any sampling time k, and a definition formula is shown as follows:

$$P(a \leq y < \xi, u(k)) = \int_a^\xi \gamma(y, u(k)) dy \qquad (1)$$

wherein in the formula (1), $\gamma(y,u(k))$ represents the PDF of the output random variable y, and is an output PDF; and $P(a \leq y<\xi, u(k))$ represents a probability that the output random variable y of the stochastic distribution system falls in a range $[\alpha, \xi]$ under the action of the control input u(k) at the time k, and an output PDF shaping $\gamma(y,u(k))$ is controlled by the control input u(k);

the control input u(k) represents the screw feeding amount, the disc gap and the mill speed;

the output random variable y represents the powder particle sizes, and the output PDF $\gamma(y,u(k))$ represents the shape of the distribution of the powder particle sizes;

a neural network is adopted for approximating the output PDF at any moment, and the neural network adopting a fixed structure is adopted for approximating the output PDF, and the neural network comprises a B-spline neural network and an RBF (radial basis function) neural network; weight of the neural network is related to the control input u(k), and the output PDF is controlled by controlling the weight of the neural network;

the B-spline neural network is adopted for approximating the output PDF, so as to obtain the following formula:

$$\gamma(y, u(k)) = \sum_{i=1}^{n} \omega_i(u(k))B_i(y) + e(y, u(k)); \forall y \in [a, b] \qquad (2)$$

wherein in the formula (2), $\omega_i(u(k))$ represents weight of the B-spline neural network at the time k, and $B_i(y)$ represents a corresponding B-spline basis function; and $e(y, u(k))$ represents an approximate error and is ignored;

an integral of the output PDF within a definition domain is always equal to 1, which indicates that n−1 weights in n weights are independent mutually, so as to obtain the following formula:

$$\gamma(y,u(k))=C(y)V(k)+h(V(k))B_n(y) \qquad (3)$$

wherein in the formula (3), $C(y)=[B_1(y), B_2(y), \ldots, B_{n-1}(y)]$ $V(k)=[\omega_1(k), \omega_2(k), L, \omega_{n-1}(k)]^T$ and h(V (k)) represent function expressions of front n−1 weights; and a following dynamic relation between the following neural network approximate weight and the control input u(k) is considered:

$$V(k+1)=f(V(k),u(k)) \qquad (4)$$

wherein in the formula (4), $f(\cdot)$ represents a function relation between the control input and the weight and is a conventional linear function or non-linear function, and a system formed by the formula (3) and the formula (4) is used for describing a relation between the control input u(k) and the output PDF of the stochastic distribution system; Therefore, the output PDF shaping is controlled by designing appropriate control input u(k);

based on the formula (3) and the formula (4), a dynamic model of the output PDF of the stochastic distribution system is shown as follows:

$$\begin{cases} V(k+1) = f(V(k), u(k)) \\ \gamma(y, u(k)) = C(y)V + (k)h(V(k))B_n(y) \end{cases} \qquad (5)$$

according to the SDC principle, based on a tracking PDF error shown in the formula (6), the target PDF shaping of the distribution of the powder particle sizes is controlled by designing different control inputs u(k);

$$e(y,u(k))=g(y)-\gamma(y,u(k)) \qquad (6)$$

wherein in the formula (6), g(y) represents the target PDF shaping of the distribution of the powder particle sizes;

in order to obtain an appropriate control input u(k), the control input u(k) is obtained by adopting an optimal performance index shown in the formula (7):

$$J = \int_a^b (g(y) - \gamma(y, u(k)))^2 dy + R_1 u^2(k) \qquad (7)$$

wherein in the formula (7), J represents a performance index adopted for designing the control input u(k), and $R_1$ represents weight of the control input.

The experimental device and the control method disclosed by the present invention have the following beneficial effects that:

An experimental device for SDC of powder particle sizes in a disc mill system is established, and the device can be used for verifying a series for SDC algorithms such as a PDF control algorithm adopting a fixed structure, iteratively learning the PDF control algorithm, predicting a study on the PDF control algorithm in a multistep manner, a robust PDF control algorithm and the like and providing a better experimental platform for teaching and scientific research.

The present invention provides the method for SDC of powder particle sizes of a disc mill system; and when an actual industrial process does not meet an assumed condition of Gaussian output, i.e. the shape of PDF of output random variables has a typical asymmetric, multi-peak and non-Gaussian distribution characteristic, according to the method, the shape of non-Gaussian distribution of output random variables of a stochastic distribution system can be effectively controlled, and a mean value and a variance of the output random variables can also be effectively controlled.

The experimental device and the control method are reasonable in design, are realized easily and have good practical value.

DETAILED DESCRIPTION OF THE PREFERRED EMBODIMENT

In order that the purposes, the technical scheme and the advantages of the present invention are more clearly understood, the present invention is further described in details through combination with drawings and embodiments. It should be understood that the described specific embodiment is only used for explaining the present invention without limiting the present invention.

Figure 2:
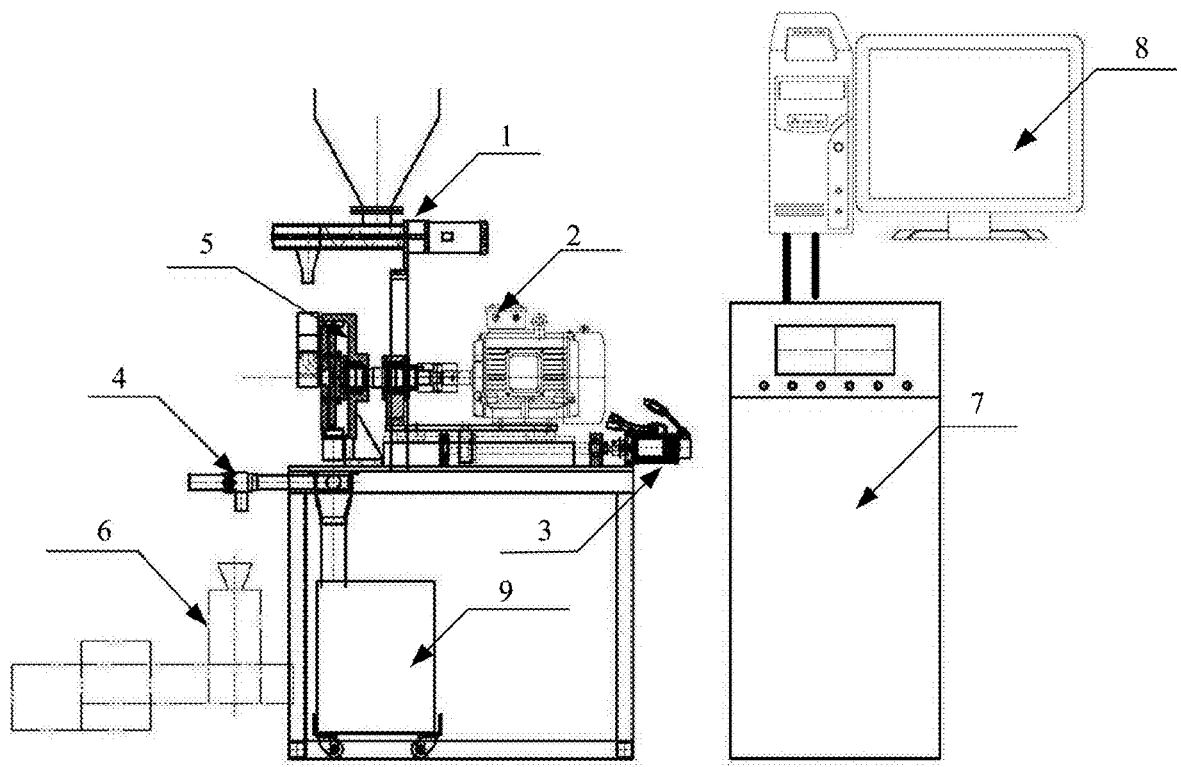
FIG. 2 is a front view of a structure of an experimental device for SDC of powder particle sizes in a disc mill system according to an embodiment of the present invention.
Figure 3:
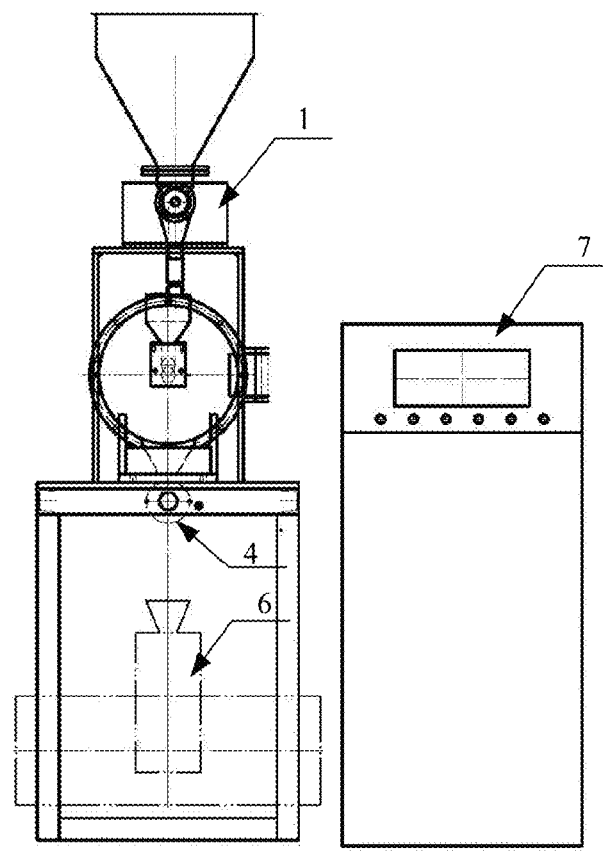
FIG. 3 is a side view of the structure of the experimental device for SDC of the powder particle sizes in the disc mill system according to the embodiment of the present invention.

In order to verify the effectiveness and the feasibility of a SDC (stochastic distribution control) method, the present invention provides an experimental device for SDC of powder particle sizes in a disc mill system. Through adoption of the disc mill system, the main purpose is that a shape of the distribution of the powder particle sizes of the disc mill system is controlled by designing different SDC algorithms; and therefore, the disc mill system provided by the present invention can be treated as a typical SDC system. As shown in FIG. 2 and FIG. 3, the experimental device comprises a screw feeding control device 1, a mill speed adjustment device 2, a mill disc gap servo control device 3, a sampling device 4, a laser particle analyzer 6, a control cabinet 7 and an upper computer 8.

The disc mill system is a vertical double-disc powder mill and comprises a movable mill disc 5 and a corresponding fixed mill disc.

Figure 4:
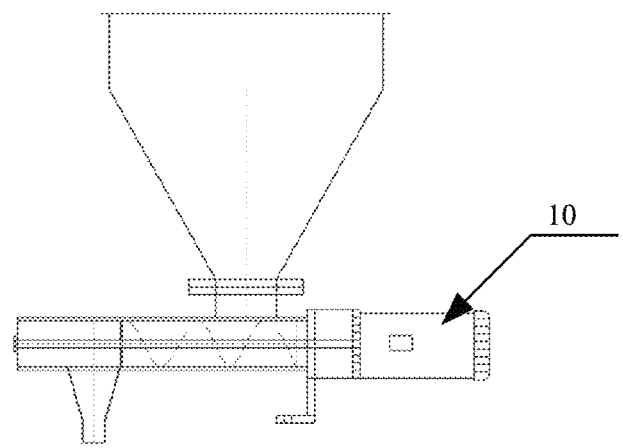
FIG. 4 is a schematic diagram illustrating a screw feeding control device of the disc mill system according to the embodiment of the present invention.

As shown in FIG. 4, the screw feeding control device 1 comprises a screw feeder, a first DC (direct current) motor 10 and an electronic scale. The screw feeder is connected with the first DC motor 10. The electronic scale is connected with the upper computer 8 and is used for measuring an actual screw feeding amount.

The screw feeding control device 1 is used for controlling the screw feeding amount according to a screw speed of the screw feeder, and the screw feeding amount is set by the upper computer 8, so that quantitative feeding of the disc mill system is achieved.

Figure 5:
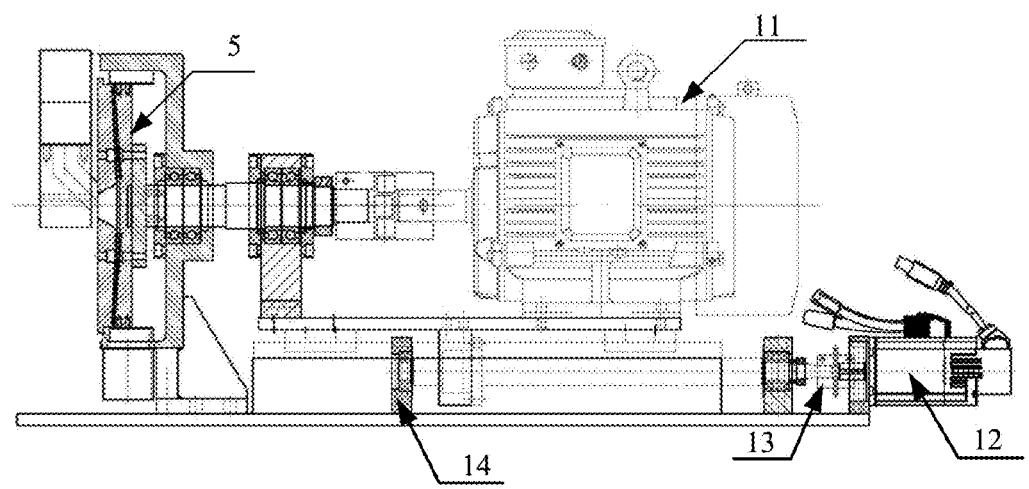
FIG. 5 is a schematic diagram illustrating a mill speed control device and a disc gap servo control device of the disc mill system according to the embodiment of the present invention.

As shown in FIG. 5, the mill speed adjustment device 2 comprises a frequency converter and a three-phase asynchronous motor 11. The three-phase asynchronous motor 11 is connected with the movable mill disc 5 of the disc mill system. After a material enters a mill area, the movable mill disc 5 is driven by the three-phase asynchronous motor 11 to rotate. The frequency converter is mounted in the control cabinet 7.

The mill speed adjustment device 2 is used for controlling a mill speed by adjusting frequency of the frequency converter.

As shown in FIG. 5, the mill disc gap servo control device 3 comprises an AC (alternating current) servo motor 12, a speed reducer 13 and a displacement sensor 14. The AC servo motor 12 is connected with the speed reducer 13. The speed reducer 13 is connected with the movable mill disc 5 of the disc mill system. The displacement sensor 14 is mounted on a driving shaft connected with the movable mill disc 5 in the disc mill system, is connected with the upper computer 8 and is used for acquiring a position signal of the movable mill disc 5 in real time and feeding back the position signal to the upper computer 8 for calculating a disc gap. The AC servo motor 12 is connected with a PLC (programmable logic controller) and the PLC is connected with the upper computer 8.

Figure 10:
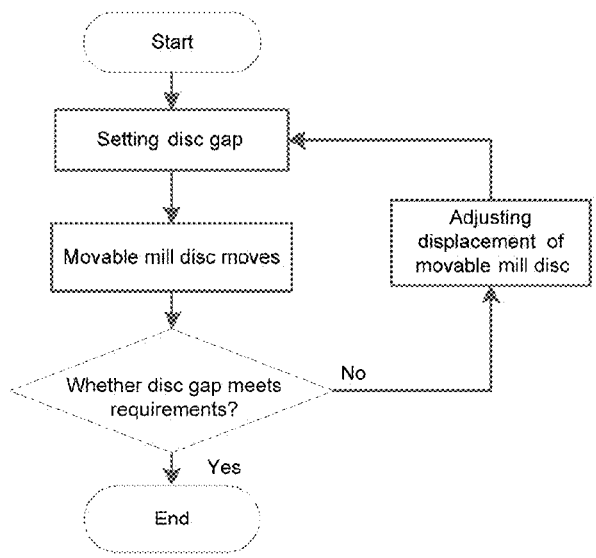
FIG. 10 is a control flow chart of a disc gap servo control device according to the embodiment of the present invention.

The disc gap servo control device 3 is used for driving the movable mill disc 5 to move horizontally, a position of the fixed mill disc is taken as a zero position, and the displacement sensor 14 is used for acquiring the position signal of the movable mill disc 5 in real time, feeding back the position signal to a system of the upper computer 8 for calculating the disc gap and driving the movable mill disc 5 to adjust the position according to a calculation result, so that the displacement of the movable mill disc 5 is accurately positioned, and the disc gap is controlled by accurately positioning the movable mill disc 5. The detailed control flow chart of the disc gap is shown in FIG. 10.

Figure 6:
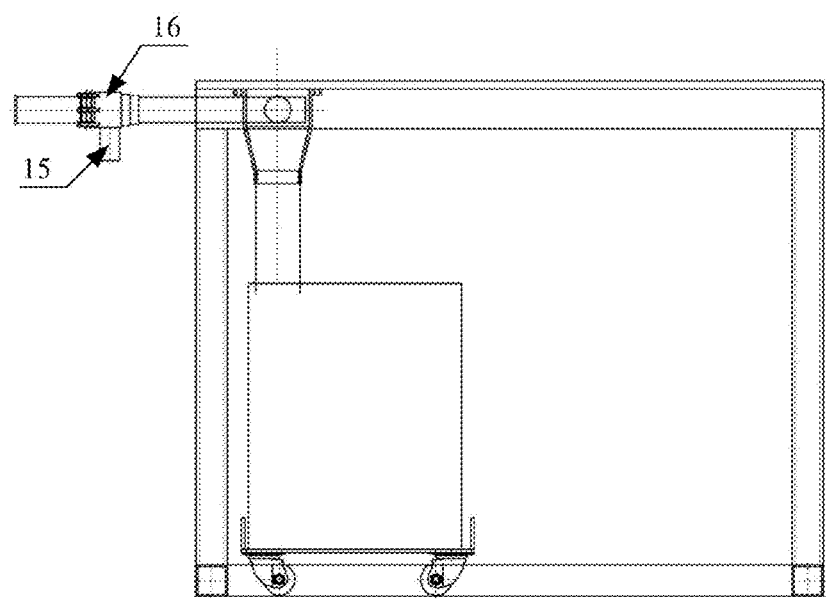
FIG. 6 is a schematic diagram illustrating a sampling device of the disc mill system according to the embodiment of the present invention.

As shown in FIG. 6, the sampling device 4 comprises a second DC motor 16, a sampling casing pipe 15 and a powder recovery tank 9. The sampling casing pipe 15 is connected with a powder outlet of the disc mill system and the powder recovery tank 9 respectively.

According to a detection period of the laser particle analyzer 6, a starting time and a stopping time of the second DC motor 16 in the sampling device 4 are set.

Figure 11:
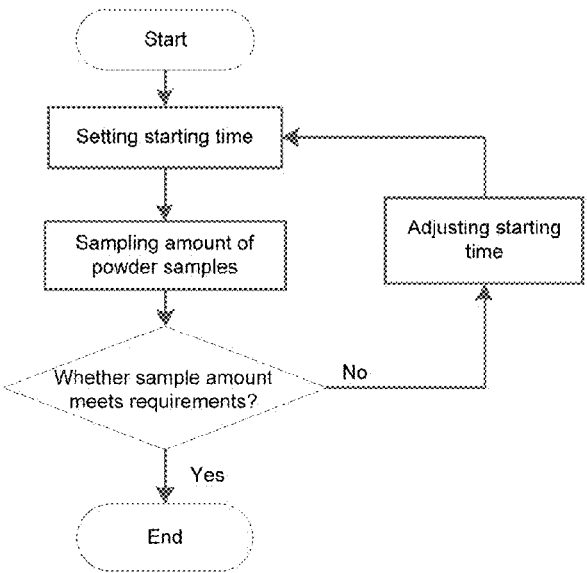
FIG. 11 is a control flow chart of the sampling device according to the embodiment of the present invention.

When the second DC motor 16 in the sampling device 4 is in a starting state, powder is sampled, a sampling amount of the powder is controlled according to the length of the starting time of the second DC motor 16, and the powder is conveyed into the laser particle analyzer 6 by the sampling casing pipe 15 When the second DC motor 16 in the sampling device 4 is in a stopping state, the produced powder enters the powder recovery tank 9, and intermittent sampling is achieved; a control flow chart of the intermittent sampling is shown in FIG. 11. The sampling amount in every detection period is the same, and the sampling amount is adjusted by controlling the length of the starting time of the second DC motor 16 in the sampling device 4.

The laser particle size analyzer 6 is a Sympatec powder laser particle analyzer and is used for detecting the distribution of particle sizes of powder samples obtained by the sampling device 4, so as to obtain a PDF (probability density function) shaping of the distribution of the powder particle sizes.

The PLC is arranged in the control cabinet 7. The PLC is connected with the first DC motor 10 of the screw feeding control device 1, the second DC motor 16 of the sampling device 4 and the AC servo motor 12 of the disc gap servo control device 3 respectively. The frequency converter is connected with the three-phase asynchronous motor 11 of the mill speed adjustment device 2.

The PLC and the frequency converter are both connected with the upper computer 8 and are used for receiving an instruction sent by the upper computer 8.

The upper computer 8 comprises a SDC algorithm. The upper computer 8 is used for setting the initial screw feeding amount, the mill speed, the mill disc gap, a target PDF shaping of the distribution of powder particle sizes as well as the starting time and the stopping time of the second DC motor 16 in the sampling device 4 and receiving set values of the screw feeding amount, the mill speed and the disc gap that are obtained by adopting the SDC algorithm.

The set values of the screw feeding amount, the mill speed and the disc gap are updated by adopting the SDC algorithm according to an actual PDF shaping of the distribution of the powder particle sizes and the set target PDF shaping of the distribution of the powder particle sizes.

The screw feeding amount is controlled by controlling the screw speed in the screw feeding control device 1.

The mill speed is controlled by adjusting the frequency of the frequency converter.

The movable mill disc 5 is driven by the AC servo motor 12 to move, and the disc gap is controlled by accurately positioning the movable mill disc 5.

Updated set values of the screw feeding amount, the mill speed and the disc gap are calculated by adopting the SDC algorithm according to the PDF shaping of the distribution of the powder particle sizes, detected by the laser particle analyzer, and the target PDF shaping of the distribution of the powder particle sizes. And a user can query the curve of the PDF shaping of the distribution of the powder particle sizes, which is detected by the laser particle analyzer 6, through the upper computer 8.

Figure 7:
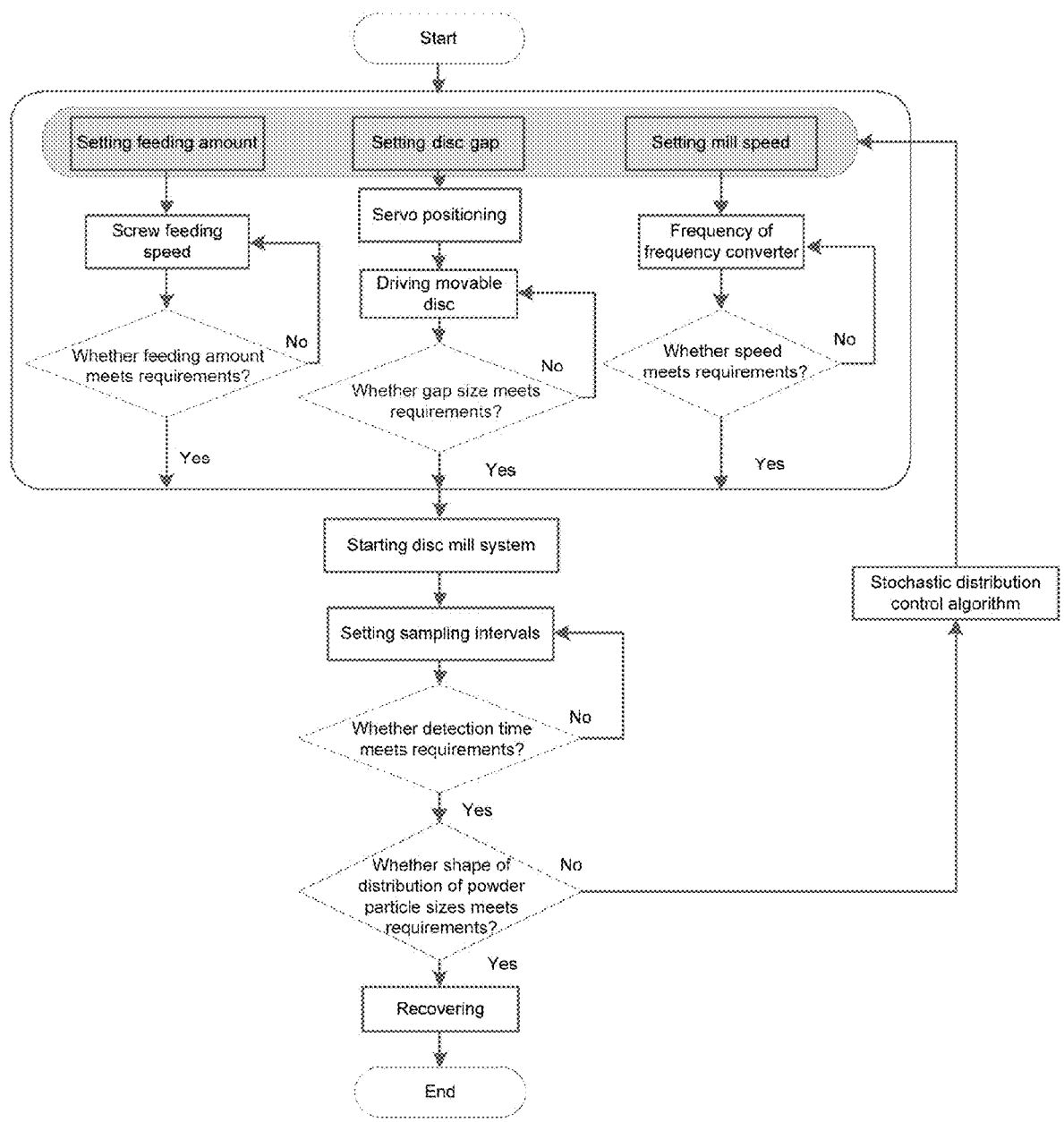
FIG. 7 is a control flow chart of the experimental device for SDC of the powder particle sizes in the disc mill system according to the embodiment of the present invention.
Figure 8:
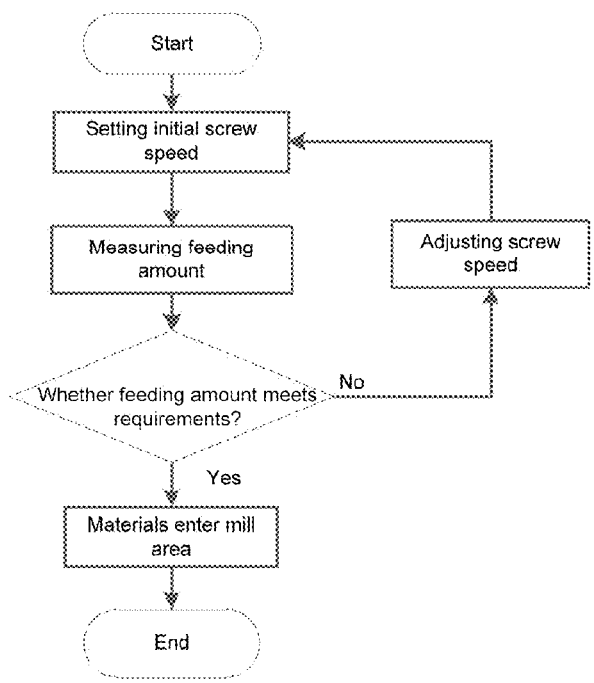
FIG. 8 is a control flow chart of the screw feeding control device according to the embodiment of the present invention.
Figure 9:
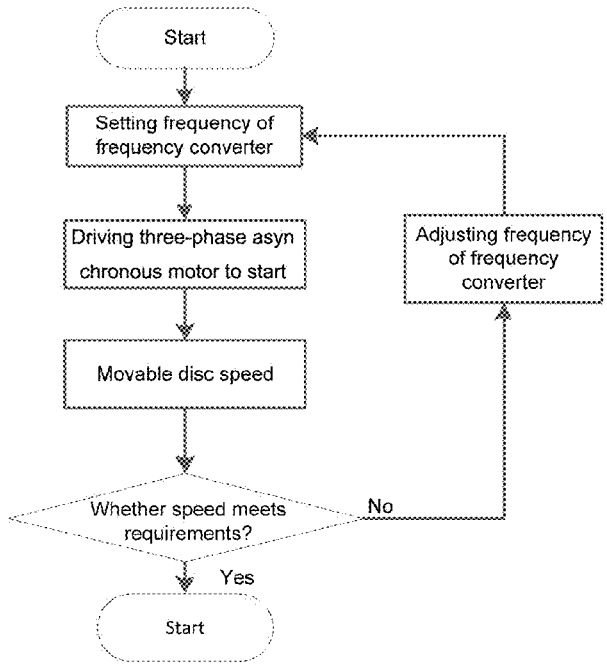
FIG. 9 is a control flow chart of a mill speed adjustment device according to the embodiment of the present invention.

The present invention provides a control method of the experimental device for SDC of the powder particle sizes in the disc mill system; as shown in FIG. 7, the control method adopts the experimental device for SDC of the powder particle sizes in the disc mill system and specifically comprises the following steps:

step 1, performing initial setting:
according to production efficiency of the disc mill system, setting the target PDF shaping of the distribution of the powder particle sizes, the initial screw feeding amount, the starting time and the stopping time of the sampling device 4, the initial disc gap and the initial mill speed through a system of the upper computer; wherein the starting time and the stopping time of the sampling device 4 are set according to a detection time required by the laser particle analyzer;

the initial mill speed is set according to actual material hardness and the production efficiency of the disc mill system;

in the embodiment, the production efficiency is 15 kg/h, the initial mill disc gap is 0.6 mm, the mill speed is 3,000 r/min, and the starting time and the stopping time of the sampling device 4 are 10 s and 30 s respectively;

a control flow process of the screw feeding amount is shown in FIG. 8, wherein the screw speed is adjusted according to the actual screw feeding amount measured by the electronic scale, so that quantitative feeding of the screw feeding control device 1 is achieved, and then the materials are conveyed into the mill area of the disc mill system;

a control flow process of the mill speed is shown in FIG. 9, wherein the mill speed of the disc mill system is controlled by adjusting the frequency of the frequency converter until the actual mill speed reaches the set mill speed;

a control flow process of the disc gap is shown in FIG. 10, wherein the system of the upper computer is used for controlling the rotating speed of the AC servo motor 12 to drive the movable mill disc 5 to move horizontally; the position of the fixed mill disc is taken as the zero position; a moving speed is adjusted by the speed reducer 13 in a moving process; the displacement sensor 14 is used for acquiring the position signal of the movable mill disc 5 in real time and feeding back the position signal to the upper computer 8; through comparison of the position signal with the set mill disc gap, whether the movable mill disc 5 reaches a specified position is judged, and the disc gap servo control device 3 is controlled for correspondingly adjusting a position of the movable mill disc 5, so that a disc gap between the movable mill disc 5 and the fixed mill disc can reach the set mill disc gap;

step 2, starting the disc mill system;

step 3, performing sampling through the disc mill system according to the starting time and the stopping time of the sampling device 4; wherein a control flow process of the sampling device 4 is shown in FIG. 11, the second DC motor 16 is started for sampling when the starting time reaches the set starting time of the second DC motor 16, and the powder enters the laser particle analyzer; the second DC motor 16 is stopped when the stopping time reaches the set stopping time of the second DC motor 16, and the powder enters the powder recovery tank 9, so that intermittent sampling is achieved; the sampling amount in every detection period is the same, and the sampling amount is judged by adjusting the length of the starting time;

Step 4, acquiring the actual PDF shaping of the distribution of the powder particle sizes and feeding back the actual PDF shaping to the upper computer 8 through the laser particle analyzer 6; and Step 5, updating the set values of the screw feeding amount, the disc gap and the mill speed with the SDC algorithm if the PDF shaping of the distribution of the powder particle sizes is inconsistent with the target PDF shaping of the distribution of the powder particle sizes; otherwise, ending the control flow process if the PDF shaping of the distribution of the powder particle sizes meet production requirements.

Figure 1:
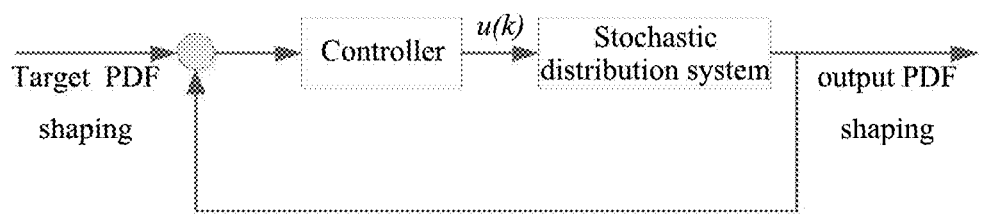
FIG. 1 is a schematic diagram illustrating the SDC principle according to an embodiment of the present invention.
Figure 12:
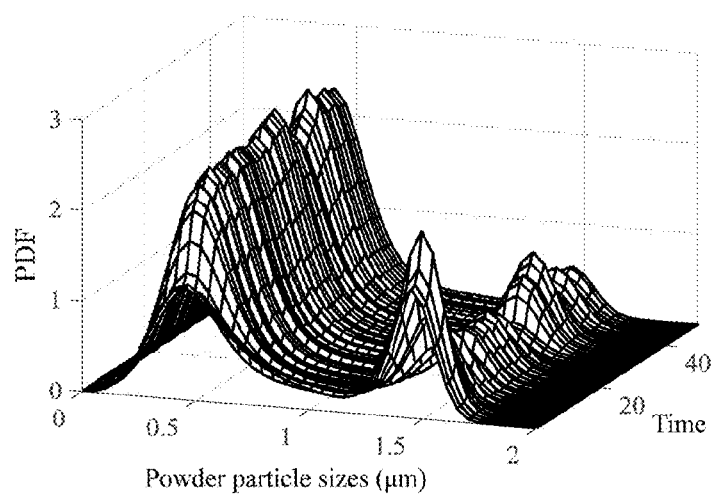
FIG. 12 is a three-dimensional chart of a PDF (probability density function) of distribution of the powder particle sizes according to the embodiment of the present invention.

According to the SDC theory, a modelling and control method of a stochastic distribution system is shown in FIG. 1 and is described as follows:

$y \in [\alpha, \xi]$ represents a uniformly-bounded stochastic variable for describing output of a dynamic stochastic distribution system, and is an output random variable; and $u(k) \in R^m$ represents a control input of the stochastic distribution system at the time k, which indicates that the output random variable y is described through the PDF shaping at any sampling time k, and a definition formula is shown as follows:

$$P(a \leq y < \xi, u(k)) = \int_a^\xi \gamma(y, u(k))dy \qquad (1)$$

wherein in the formula (1), $\gamma(y,u(k))$ represents the PDF of the output random variable Y, and is an output PDF; and $P(\alpha \leq y < \xi, u(k))$ represents a probability that the output random variable y of the stochastic distribution system falls in a range $[\alpha, \xi]$ under the action of the control input u(k) at the time k, and an output PDF shaping $\gamma(y,u(k))$ is controlled by the control input u(k);

the control input u(k) represents the screw feeding amount, the mill disc gap and the mill speed;

the output random variable y represents the powder particle sizes, and the output PDF $\gamma(y, u(k))$ represents the shape of the distribution of the powder particle sizes. A three-dimensional chart of a PDF (probability density function) of distribution of the powder particle sizes according to the embodiment of the present invention is shown in FIG. 12.

A neural network is adopted for approximating the output PDF at any moment, and the neural network adopting a fixed structure is adopted for approximating the output PDF, and the neural network comprises a B-spline neural network and an RBF (radial basis function) neural network; weight of the neural network is related to the control input u(k), and the output PDF is controlled by controlling the weight of the neural network;

in the embodiment, the B-spline neural network is adopted for approximating the output PDF, so as to obtain the following formula:

$$\gamma(y, u(k)) = \sum_{i=1}^n \omega_i(u(k))B_i(y) + e(y, u(k)); \forall y \in [a, b] \qquad (2)$$

wherein in the formula (2), $\omega_i(u(k))$ represents weight of the B-spline neural network at the time k, and $B_i(y)$ represents a corresponding B-spline basis function; and $e(y, u(k))$ represents an approximate error, and is ignored;

an integral of the output PDF within a definition domain is always equal to 1, which indicates that n−1 weights in n weights are independent mutually, so as to obtain the following formula:

$$\gamma(y,u(k))=C(y)V(k)+h(V(k))B_n(y) \qquad (3)$$

wherein in the formula (3), $C(y)=[B_1(y), B_2(y), \ldots, B_{n-1}(y)]$, $V(k)=[\omega_1(k), \omega_2(k), L, \omega_{n-1}(k)]^T$ and $h(V(k))$ represent function expressions of front n−1 weights; and a following dynamic relation between the following neural network approximate weight and the control input u(k) is considered:

$$V(k+1)=f(V(k),u(k)) \qquad (4)$$

wherein in the formula (4), $f(\cdot)$ represents a function relation between the control input and the weight and is a conventional linear function or non-linear function, and a system formed by the formula (3) and the formula (4) is used for describing a relation between the control input u(k) and the output PDF of the stochastic distribution system; and therefore, the output PDF shaping is controlled by designing appropriate control input u(k);

based on the formula (3) and the formula (4), a dynamic model of the output PDF of the stochastic distribution system is shown as follows:

$$\begin{cases} V(k+1) = f(V(k), u(k)) \\ \gamma(y, u(k)) = C(y)V(k) + h(V(k))B_n(y) \end{cases} \qquad (5)$$

according to a SDC principle, based on a tracking PDF error shown in the formula (6), the target PDF shaping of the distribution of the powder particle sizes is controlled by designing different control inputs u(k);

$$e(y,u(k))=g(y)-\gamma(y,u(k)) \qquad (6)$$

wherein in the formula (6), g(y) represents the target PDF shaping of the distribution of the powder particle sizes;

in order to obtain an appropriate control input u(k), the control input u(k) is obtained by adopting an optimal performance index shown in the formula (7):

$$J = \int_a^b (g(y) - \gamma(y, u(k)))^2 dy + R_1 u^2(k) \qquad (7)$$

Wherein in the formula (7), J represents a performance index adopted for designing the control input u(k), and $R_1$ represents weight of the control input.

What is claimed is:
1. An experimental device for SDC (stochastic distribution control) of powder particle sizes in a disc mill system, adopting the disc mill system, and comprising: a screw feeding control device, a mill speed adjustment device, a mill disc gap servo control device, a sampling device, a laser particle analyzer, a control cabinet and an upper computer;
wherein the disc mill system is a vertical double-disc powder mill and comprises a movable mill disc and a corresponding fixed mill disc;
wherein the screw feeding control device comprises a screw feeder, a first DC (direct current) motor and an electronic scale; wherein the screw feeder is connected with the first DC motor, and the electronic scale is connected with the upper computer and is used for measuring a screw feeding amount;
wherein the mill speed adjustment device comprises a frequency converter and a three-phase asynchronous motor; wherein the three-phase asynchronous motor is connected with the movable mill disc of the disc mill system; after a material enters a mill area, the movable mill disc is driven by the three-phase asynchronous motor to rotate; and the frequency converter is mounted in the control cabinet;
wherein the mill disc gap servo control device comprises an AC (alternating current) servo motor, a speed reducer and a displacement sensor; wherein the AC servo motor is connected with the speed reducer, the speed reducer is connected with the movable mill disc of the disc mill system, and the displacement sensor is mounted on a driving shaft connected with the movable mill disc in the disc mill system and is connected with the upper computer;
wherein the sampling device comprises a second DC motor, a sampling casing pipe and a powder recovery tank; wherein the sampling casing pipe is connected with a powder outlet of the disc mill system and the powder recovery tank respectively;

wherein according to a detection period of the laser particle analyzer, a starting time and a stopping time of the second DC motor are set;

wherein a PLC (programmable logic controller) is arranged in the control cabinet, the PLC is connected with the first DC motor of the screw feeding control device, the second DC motor of the sampling device and the AC servo motor of the mill disc gap servo control device respectively, and the frequency converter is connected with the three-phase asynchronous motor of the mill speed adjustment device;

wherein the PLC and the frequency converter are both connected with the upper computer and are used for receiving an instruction sent by the upper computer;

wherein the screw feeding control device is used for controlling the screw feeding amount according to a screw speed of the screw feeder, and the screw feeding amount is set by the upper computer, so that quantitative feeding of the disc mill system is achieved;

wherein the mill speed adjustment device is used for controlling a mill speed by adjusting frequency of the frequency converter;

wherein the disc gap servo control device is used for driving the movable mill disc to move horizontally, a position of the fixed mill disc is taken as a zero position, and the displacement sensor is used for acquiring a position signal of the movable mill disc in real time, feeding back the position signal to a system of the upper computer for calculating a mill disc gap and driving the movable mill disc to adjust a position according to a calculation result, so that a displacement of the movable mill disc is accurately positioned, and the mill disc gap is controlled by accurately positioning the movable mill disc;

wherein when the second DC motor in the sampling device is in a starting state, powder is sampled, a sampling amount of the powder is controlled according to a length of the starting time of the second DC motor, and the powder is conveyed into the laser particle analyzer through the sampling casing pipe; when the second DC motor in the sampling device is in a stopping state, the produced powder enters the powder recovery tank, and intermittent sampling is achieved; the sampling amount in every detection period is the same, and the sampling amount is adjusted by controlling the length of the starting time of the second DC motor in the sampling device;

wherein the upper computer comprises a SDC algorithm; the upper computer is used for setting initial values of the screw feeding amount, the mill speed, the mill disc gap, a target PDF (probability density function) shaping of a distribution of powder particle sizes as well as the starting time and the stopping time of the second DC motor in the sampling device and receiving set values of the screw feeding amount, the mill speed and the mill disc gap which are obtained by adopting the SDC algorithm;

wherein the set values of the screw feeding amount, the mill speed and the mill disc gap are updated by adopting the SDC algorithm according to an actual PDF shaping of the distribution of the powder particle sizes and the set target PDF shaping of the distribution of the powder particle sizes;

wherein the screw feeding amount is controlled by controlling the screw speed in the screw feeding control device;

wherein the mill speed is controlled by adjusting the frequency of the frequency converter;

wherein the movable mill disc is driven by the AC servo motor to move, and the mill disc gap is controlled by accurately positioning the movable mill disc; and wherein the updated set values of the screw feeding amount, the mill speed and the mill disc gap are calculated by adopting the SDC algorithm according to the actual PDF shaping of the distribution of the powder particle sizes, detected by the laser particle analyzer, and the set target PDF shaping of the distribution of the powder particle sizes; a user can query a curve of the actual PDF shaping of the distribution of the powder particle sizes, which is detected by the laser particle analyzer, through the upper computer.

2. The experimental device according to claim 1, wherein the laser particle analyzer is a Sympatec powder laser particle analyzer and is used for detecting the distribution of particle sizes of powder samples obtained by the sampling device, so as to obtain the actual PDF shaping of the distribution of the powder particle sizes.

3. A control method of an experimental device for SDC (stochastic distribution control) of powder particle sizes in a disc mill system, comprising the following steps:

step 1, performing an initial setting:

according to a production efficiency of the disc mill system, setting a target PDF (probability density function) shaping of a distribution of the powder particle sizes, an initial value of a screw feeding amount, a starting time and a stopping time of a second DC motor in a sampling device, an initial value of a mill disc gap and an initial value of a mill speed through a system of an upper computer and receiving set values of the screw feeding amount, the mill speed and the mill disc gap which are obtained by adopting a SDC algorithm of the upper computer;

wherein the starting time and the stopping time of the second DC motor in the sampling device are set according to a detection time required by a laser particle analyzer;

the initial value of the mill speed is set according to actual material hardness and the production efficiency of the disc mill system;

a control flow process of the screw feeding amount lies in that a screw speed is adjusted according to the screw feeding amount measured by an electronic scale, so that quantitative feeding of a screw feeding control device is achieved, the screw feeding control device is used for controlling the screw feeding amount according to the screw speed of a screw feeder, and the screw feeding amount is set by the upper computer, so that quantitative feeding of the disc mill system is achieved, and then a material is conveyed into a mill area of the disc mill system;

a control flow process of the mill speed lies in that the mill speed of the disc mill system is controlled by adjusting frequency of a frequency converter with a mill speed adjustment device until the mill speed reaches the set mill speed;

a control flow process of the mill disc gap lies in that the system of the upper computer is used for controlling a rotating speed of an AC servo motor to drive a movable mill disc to move horizontally; a position of a fixed mill disc is taken as a zero position; a moving speed is adjusted by a speed reducer in a moving process; a displacement sensor is used for acquiring a position signal of the movable mill disc in real time and feeding back the position signal to the system of the upper computer for calculating a mill disc gap; through comparison of the position signal with the set mill disc gap, whether the movable mill disc reaches a specified position is judged, and a mill disc gap servo control device is controlled for correspondingly adjusting a position of the movable mill disc according to a calculation result, so that the mill disc gap between the movable mill disc and the fixed mill disc can reach the set mill disc gap, a displacement of the movable mill disc is accurately positioned, and the mill disc gap is controlled by accurately positioning the movable mill disc;

step 2, starting the disc mill system;

step 3, performing sampling through the disc mill system according to the starting time and the stopping time of the second DC motor in the sampling device;

wherein a control flow process of the sampling device lies in that the second DC motor is started for sampling when the starting time reaches the set starting time of the second DC motor, and when the second DC motor in the sampling device is in a starting state, powder is sampled, a sampling amount of the powder is controlled according to a length of the starting time of the second DC motor, and powder is conveyed into the laser particle analyzer through a sampling casing pipe; the second DC motor is stopped when the stopping time reaches the set stopping time of the second DC motor, when the second DC motor in the sampling device is in a stopping state, the produced powder enters a powder recovery tank, so that intermittent sampling is achieved; the sampling amount in every detection period is the same, and the sampling amount is judged by adjusting the length of the starting time of the second DC motor in the sampling device;

step 4, acquiring an actual PDF shaping of the distribution of the powder particle sizes and feeding back the actual PDF shaping to the upper computer through the laser particle analyzer; and step 5, updating the set values of the screw feeding amount, the mill disc gap and the mill speed with a SDC algorithm according to the actual PDF shaping of the distribution of the powder particle sizes, detected by the laser particle analyzer, and the set target PDF shaping of the distribution of the powder particle sizes if the actual PDF shaping of the distribution of the powder particle sizes is inconsistent with the set target PDF shaping of the distribution of the powder particle sizes; otherwise, ending the control flow process if the actual PDF shaping of the distribution of the powder particle sizes meets production requirements; a user can query a curve of the actual PDF shaping of the distribution of the powder particle sizes, which is detected by the laser particle analyzer, through the upper computer.

4. The control method according to claim 3, wherein according to a SDC theory, a modelling and control method of a stochastic distribution system is described as follows:

$y \in [\alpha, \xi]$ represents a uniformly-bounded stochastic variable for describing output of a dynamic stochastic distribution system, and is an output random variable; and $u(k) \in R^m$ represents a control input of the stochastic distribution system at the time k, which indicates that the output random variable y is described through a PDF shaping at any sampling time k, and a definition formula is shown as follows:

$$P(a \le y < \xi, u(k)) = \int_0^\xi \gamma(y, u(k))dy \quad (1)$$

wherein in the formula (1), $\gamma(y,u(k))$ represents the PDF of the output random variable y, and is an output PDF; and $P(a \le y < \xi, u(k))$ represents a probability that the output random variable y of the stochastic distribution system falls in a range $[\alpha, \xi]$ under the action of the control input u(k) at the time k, and an output PDF shaping $\gamma(y,u(k))$ is controlled by the control input u(k);

the control input u(k) represents the screw feeding amount, the mill disc gap and the mill speed; and the output random variable y represents the powder particle sizes, and the output PDF $\gamma(y,u(k))$ represents the shape of the distribution of the powder particle sizes;

a neural network is adopted for approximating the output PDF at any moment, and the neural network adopting a fixed structure is adopted for approximating the output PDF, and the neural network comprises a B-spline neural network and an RBF (radial basis function) neural network; weight of the neural network is related to the control input u(k), and the output PDF is controlled by controlling the weight of the neural network;

the B-spline neural network is adopted for approximating the output PDF, so as to obtain the following formula:

$$\gamma(y, u(k)) = \sum_{i=1}^n \omega_i(u(k))B_i(y) + e(y, u(k)); \forall y \in [a, b] \quad (2)$$

wherein in the formula (2), $\omega_i(u(k))$ represents weight of the B-spline neural network at the time k, and $B_i(y)$ represents a corresponding B-spline basis function; and e(y, u(k)) represents an approximate error and is ignored;

an integral of the output PDF within a definition domain is always equal to 1, which indicates that n−1 weights in n weights are independent mutually, so as to obtain the following formula:

$$\gamma(y,u(k))=C(y)V(k)+h(V(k))B_n(y) \quad (3)$$

wherein in the formula (3), $C(y)=[B_1(y), B_2(y), \ldots, B_{n-1}(y)]$, $V(k)=[\omega_1(k), \omega_2(k), L, \omega_{n-1}(k)]^T$ and h(V(k)) represent function expressions of front n−1 weights; and a following dynamic relation between the following neural network approximate weight and the control input u(k) is considered:

$$V(k+1)=f(V(k),u(k)) \quad (4)$$

wherein in the formula (4), $f(\cdot)$ represents a function relation between the control input and the weight and is a conventional linear function or non-linear function, and a system formed by the formula (3) and the formula (4) is used for describing a relation between the control input u(k) and the output PDF of the stochastic distribution system; and therefore, the output PDF shaping is controlled by designing appropriate control input u(k);

based on the formula (3) and the formula (4), a dynamic model of the output PDF of the stochastic distribution system is shown as follows:

$$\begin{cases} V(k+1) = f(V(k), u(k)) \\ \gamma(y, u(k)) = C(y)V(k) + h(V(k))B_n(y) \end{cases} \quad (5)$$

according to a SDC principle, based on a tracking PDF error shown in the formula (6), the set target PDF shaping of the distribution of the powder particle sizes is controlled by designing different control inputs u(k);

$$e(y,u(k)) = g(y) - \gamma(y,u(k)) \quad (6)$$

wherein in the formula (6), g(y) represents the set target PDF shaping of the distribution of the powder particle sizes;

in order to obtain an appropriate control input u(k), the control input u(k) is obtained by adopting an optimal performance index shown in the formula (7):

$$J = \int_a^b (g(y) - \gamma(y, u(k)))^2 dy + R_1 u^2(k) \quad (7)$$

wherein in the formula (7), J represents a performance index adopted for designing the control input u(k), and $R_1$ represents weight of the control input.

* * * * *